United States Patent
Sutterfield et al.

(10) Patent No.: US 11,326,551 B1
(45) Date of Patent: May 10, 2022

(54) EXHAUST NOZZLE HAVING A COMPLIANT SHELL FOR A GAS TURBINE ENGINE

(71) Applicants: Rolls-Royce North American Technologies Inc., Indianapolis, IN (US); Rolls-Royce Corporation, Indianapolis, IN (US)

(72) Inventors: David L. Sutterfield, Greenwood, IN (US); Jack D. Petty, Indianapolis, IN (US); Bryan H. Lerg, Carmel, IN (US); Andrew Sanderson, Indianapolis, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 324 days.

(21) Appl. No.: 16/803,540

(22) Filed: Feb. 27, 2020

(51) Int. Cl.
*F02K 1/04* (2006.01)
*F02K 1/80* (2006.01)
*F02K 1/08* (2006.01)

(52) U.S. Cl.
CPC ............... *F02K 1/04* (2013.01); *F02K 1/08* (2013.01); *F02K 1/80* (2013.01); *F05D 2240/12* (2013.01); *F05D 2260/31* (2013.01); *F05D 2260/941* (2013.01)

(58) Field of Classification Search
CPC ..... F02K 1/04; F02K 1/08; F02K 1/80; F01D 9/02; F01D 25/28; F05D 2240/12; F05D 2260/31; F05D 2260/941
USPC ............. 123/243; 415/220, 191; 239/265; 60/200
See application file for complete search history.

(56) References Cited

U.S. PATENT DOCUMENTS

| | | | |
|---|---|---|---|
| 3,289,946 A | 12/1966 | Lennard | |
| 3,807,639 A * | 4/1974 | Soligny | F02K 1/08 239/265.19 |
| 4,527,388 A | 7/1985 | Wallace et al. | |
| 4,592,508 A | 6/1986 | Thornock | |
| 4,802,629 A | 2/1989 | Klees | |
| 7,174,704 B2 | 2/2007 | Renggli | |
| 7,178,338 B2 | 2/2007 | Whurr | |
| 8,091,334 B2 | 1/2012 | Moniz et al. | |
| 8,443,931 B2 | 5/2013 | Pilon | |
| 9,181,899 B2 | 11/2015 | Dindar et al. | |
| 9,670,877 B2 * | 6/2017 | Sawyers-Abbott | F02K 1/763 |
| 2010/0095650 A1 | 4/2010 | Schafer | |
| 2014/0366453 A1 * | 12/2014 | Cooper | F01D 25/24 49/506 |
| 2016/0115904 A1 * | 4/2016 | Sutterfield | F02C 7/28 60/770 |
| 2021/0270207 A1 * | 9/2021 | Sutterfield | F02K 1/08 |
| 2021/0270208 A1 * | 9/2021 | Sutterfield | F02K 1/04 |

* cited by examiner

Primary Examiner — J. Todd Newton
(74) Attorney, Agent, or Firm — Barnes & Thornburg LLP

(57) ABSTRACT

An exhaust nozzle for use with a gas turbine engine includes an outer shroud, an inner plug spaced radially apart from the outer shroud, and at least one support vane that is coupled to the outer shroud. The outer shroud and the inner plug cooperate to provide an exhaust nozzle flow path therebetween. The at least one support vane interconnects the outer shroud and the inner plug to support the inner plug in the exhaust nozzle flow path.

20 Claims, 5 Drawing Sheets

EXHAUST NOZZLE HAVING A COMPLIANT SHELL FOR A GAS TURBINE ENGINE

FIELD OF THE DISCLOSURE

The present disclosure relates generally to gas turbine engines, and more specifically to variable exhaust nozzles for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion may be released out of the turbine into an exhaust nozzle where they are directed away from the engine.

Exhaust nozzles may encounter relatively high temperatures due to their proximity to the turbine and the hot products discharged therefrom. Accordingly, supporting various components in the exhaust nozzle while considering these relatively high temperatures remains an area of interest.

SUMMARY

The present disclosure may comprise one or more of the following features and combinations thereof.

According to one aspect of the present disclosure, a gas turbine engine includes an engine core and an exhaust nozzle. The engine core may include a compressor configured to receive and compress an airflow, a combustor configured to receive a compressed airflow from the compressor and combust the compressed airflow to produce combustion products, and a turbine configured to interact with the combustion products. The exhaust nozzle may be configured to receive the combustion products from the engine core.

In some embodiments, the exhaust nozzle includes an outer shroud arranged circumferentially about an axis to define an outer boundary surface of an exhaust nozzle flow path, an inner plug arranged circumferentially about the axis to define an inner boundary surface of the exhaust nozzle flow path, and a support vane that extends between the outer shroud and the inner plug through the exhaust nozzle flow path. The inner plug may include a plug-support frame coupled to the support vane, an outer plug shell that covers the plug-support frame. The support vane may include a vane-support frame that interconnects the plug-support frame and the outer shroud and an outer vane shell that covers the vane-support frame.

In some embodiments, both the inner plug and the support vane further include a plurality of fastener units that couple the outer plug shell to the plug support frame and couple the outer vane shell to the vane-support frame. The plurality of fastener units may be configured to allow the outer plug shell to thermally expand and contract relative to the plug-support frame and to allow the outer vane shell to thermally expand and contract relative to the vane-support frame.

In some embodiments, each fastener unit included in the plurality of fastener units includes a wear plate fixed to an inner surface of one of the outer plug shell and the outer vane shell, a fastener that extends through the wear plate and one of the outer plug shell and the outer vane shell, and a nut-plate coupled to one of the plug-support frame and the vane-support frame to receive the fastener and couple the outer plug shell to the plug-support frame and to couple the outer vane shell to the vane-support frame.

In some embodiments, the plurality of fastener units includes an anchor fastener unit and an expansion-permissive fastener unit, the nut plate of the anchor fastener unit being formed to include a circular shaped aperture that receives the fastener of the anchor fastener unit to fix the outer vane shell and the outer plug shell in position relative to the anchor fastener unit, the nut plate of the expansion-permissive fastener unit being formed to include a longitudinal slot that receives the fastener of the expansion-permissive fastener unit.

In some embodiments, the fastener of the expansion-permissive fastener unit is configured to translate through the longitudinal slot as the temperature of the exhaust nozzle changes to allow the outer plug shell and the outer vane shell to thermally expand and contract relative to the plug-support frame and to allow the outer vane shell to thermally expand and contract relative to the vane support frame.

In some embodiments, the longitudinal slot in the nut-plate of the expansion-permissive fastener unit is elongated along a first axis that extends through a center of the fastener of the anchor fastener unit.

According to another aspect of the present disclosure, an exhaust nozzle for a gas turbine engine may include an outer shroud, an inner plug, and a support vane. The outer shroud may be arranged circumferentially about an axis to define an outer boundary surface of an exhaust nozzle flow path. The inner plug may be arranged circumferentially about the axis to define an inner boundary surface of the exhaust nozzle flow path. The support vane may extend between the outer shroud and the inner plug through the exhaust nozzle flow path.

In some embodiments, the inner plug includes a plug-support frame coupled to the support vane, an outer plug shell that covers the plug-support frame, and a plurality of fastener units that couple the outer plug shell to the plug support frame and are configured to allow the outer plug shell to thermally expand and contract relative to the plug-support frame.

In some embodiments, each fastener unit includes a wear plate fixed to an inner surface of the outer plug shell, a fastener that extends through the wear plate and the outer plug shell, and a nut-plate coupled to the plug-support frame to receive the fastener and couple the outer plug shell to the plug-support frame.

In some embodiments, the plurality of fastener units includes an anchor fastener unit and a plurality of expansion-permissive fastener units, the anchor fastener unit being configured to fix the outer plug shell relative to the plug-support frame, the plurality of second expansion permissive fasteners being configured to allow thermal growth of the outer plug shell toward and away from the anchor fastener unit.

In some embodiments, each expansion-permissive fastener unit includes a fastener and a nut plate that is formed to include a longitudinal slot and the fastener is configured to translate through the longitudinal slot as the temperature of the exhaust nozzle changes to allow the outer plug shell to thermally expand and contract relative to the plug-support frame.

In some embodiments, the longitudinal slot in the nut-plate of each expansion-permissive fastener unit is elongated along an axis that extends through a center of the anchor fastener unit. In some embodiments, at least two of the axes are non-parallel to one another. In some embodiments, the anchor fastener unit is located at an axially forward end of the inner plug relative to the central axis and the plurality of expansion-permissive fastener units are located axially aft of the anchor fastener unit.

According to another aspect of the present disclosure, an exhaust nozzle for a gas turbine engine may include an outer shroud, an inner plug, and a support vane. The outer shroud may be arranged circumferentially about an axis to define an outer boundary surface of an exhaust nozzle flow path. The inner plug may be arranged circumferentially about the axis to define an inner boundary surface of the exhaust nozzle flow path. The support vane may extend between the outer shroud and the inner plug through the exhaust nozzle flow path.

In some embodiments, the support vane includes a vane-support frame coupled to the inner plug, an outer vane shell that covers the vane-support frame, and a plurality of fastener units that couple the outer vane shell to the vane support frame and are configured to allow the outer vane shell to thermally expand and contract relative to the vane-support frame.

In some embodiments, each fastener unit includes a wear plate fixed to an inner surface of the outer vane shell, a fastener that extends through the wear plate and the outer vane shell, and a nut-plate coupled to the vane-support frame to receive the fastener and couple the outer vane shell to the vane-support frame.

In some embodiments, the plurality of fastener units includes an anchor fastener unit and a plurality of expansion-permissive fastener units, the anchor fastener unit being configured to fix the outer vane shell relative to the vane-support frame, the plurality of second expansion permissive fasteners being configured to allow thermal growth of the outer vane shell toward and away from the anchor fastener unit.

In some embodiments, the plurality of expansion-permissive fastener unit each include a fastener and a nut plate that is formed to include a longitudinal slot and the fastener is configured to translate through the longitudinal slot as the temperature of the exhaust nozzle changes to allow the outer plug shell to thermally expand and contract relative to the plug-support frame.

In some embodiments, the longitudinal slot in the nut-plate of each expansion-permissive fastener unit is elongated along an axis that extends through a center of the anchor fastener unit. In some embodiments, at least two of the axes are non-parallel to one another.

In some embodiments, the outer vane shell includes a first panel and a second panel, both the first panel and the second panel including an anchor fastener unit at a forwardmost and innermost corner of each panel relative to the central axis that fixes the first panel and the second panel relative to the vane-support frame and a plurality of second expansion permissive fasteners that allow the first panel and the second panel to thermally expand and contract toward and away from the anchor fastener unit of the first panel and the second panel.

In some embodiments, the outer vane shell further includes a joint strip between the first panel and the second panel that provides a clearance gap to allow the first panel to thermally expand toward the second panel away from the anchor fastener unit of the first panel.

These and other features of the present disclosure will become more apparent from the following description of the illustrative embodiments.

DETAILED DESCRIPTION OF THE DRAWINGS

Figure 1:
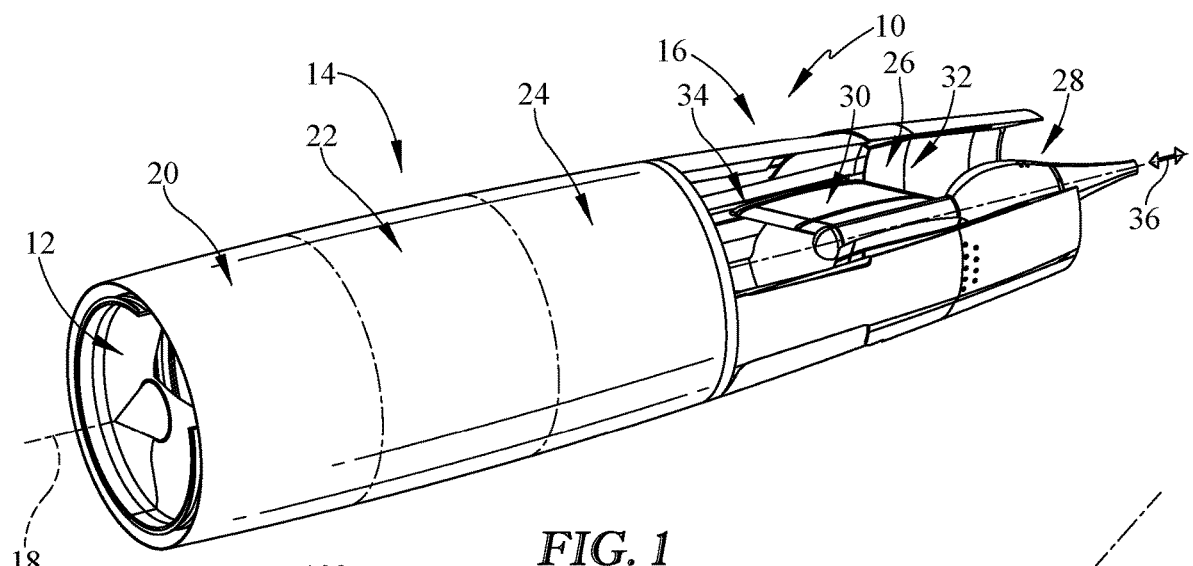
FIG. 1 is a perspective view of a gas turbine engine that includes a fan, an engine core, and an exhaust nozzle arranged downstream of the engine core with a section of the exhaust nozzle cut away to show that the exhaust nozzle includes an outer shroud, an inner plug spaced radially inward from the outer shroud, and a pair of support vanes interconnecting the outer shroud and the inner plug through an exhaust nozzle flow path.

For the purposes of promoting an understanding of the principles of the disclosure, reference will now be made to a number of illustrative embodiments illustrated in the drawings and specific language will be used to describe the same.

An aerospace gas turbine engine 10 is shown in FIG. 1 and includes a fan 12, an engine core 14, and exhaust nozzle 16. The fan 12 is coupled to the engine core 14 for rotation by the engine core 14 about an axis 18 during use. The engine core 14 receives and combusts fuel to drive rotation of one or more shafts (not shown). The exhaust nozzle 16 is located axially aft of the engine core 14 and is configured to expel exhaust products produced by the engine core 14 downstream into the atmosphere.

The engine core 14 includes a compressor section 20, a combustor section 22, and a turbine section 24 as shown in FIG. 1. The compressor section 20 compresses and delivers pressurized air to the combustor section 22. The combustor section 22 mixes fuel with the pressurized air received from the compressor section 20 and ignites the fuel. The hot, high-pressure products of the combustion reaction in the combustor section 22 are directed into the turbine section 24 to cause portions of the turbine section 24 to rotate about the axis 18 and drive portions of the compressor section 20. The fan 12 is also coupled to the turbine section 24 by at least one of the shafts driven in rotation by the engine core 14 and provides thrust for propelling an air vehicle when rotated by the turbine section 24. The exhaust products of the engine core 14 are directed into the exhaust nozzle 16 where a flow of the exhaust products are manipulated by the exhaust nozzle 16 prior to being released into the atmosphere.

Figure 2:
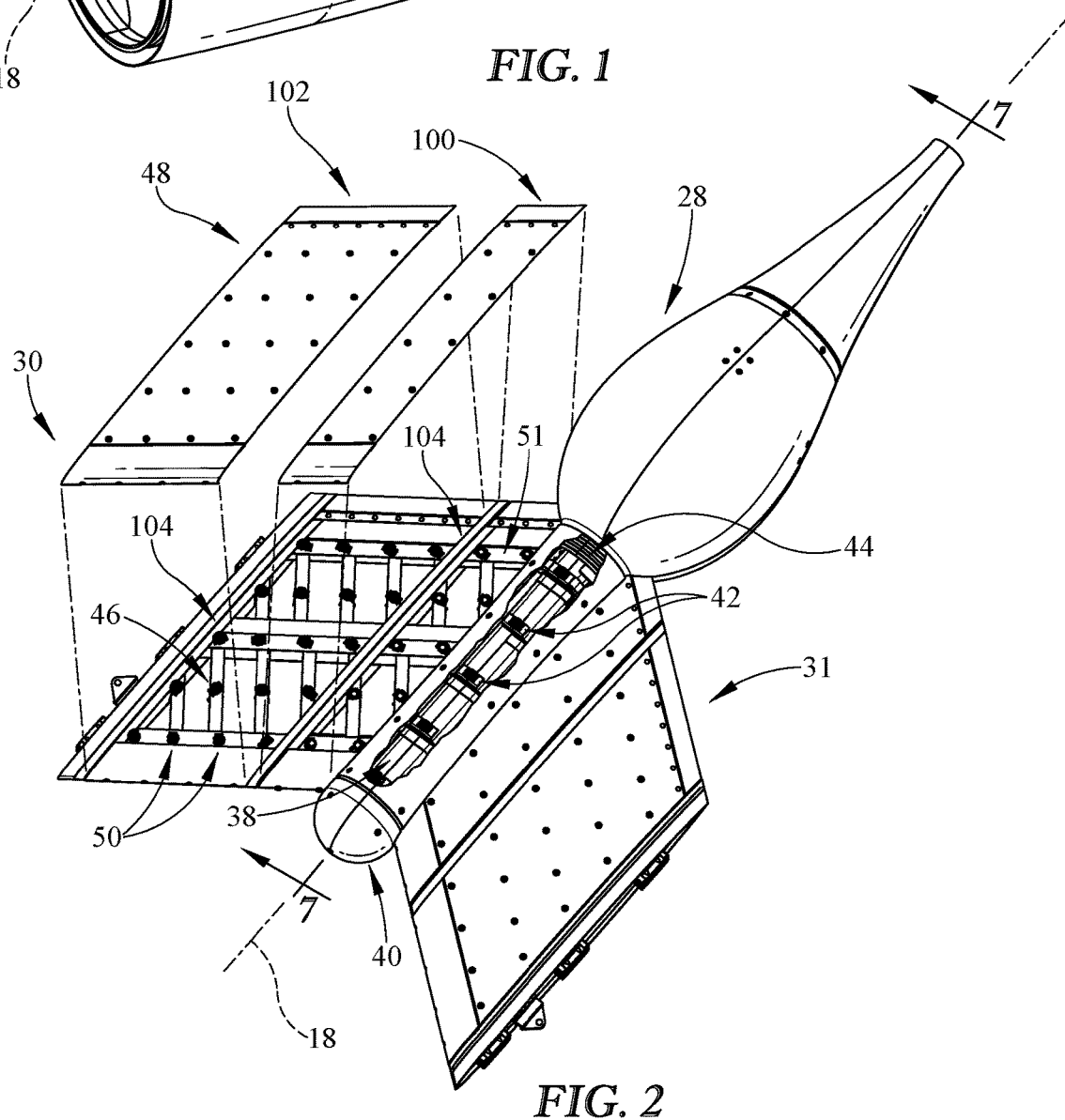
FIG. 2 is a perspective view of the inner plug and the support vanes of the exhaust nozzle of FIG. 1 showing that the inner plug includes an outer plug shell and an underlying plug-support frame and the vanes include an outer vane shell and an underlying vane-support frame and further showing that the inner plug and the vane each include a plurality of fastener units that interconnect the outer shell and the support frame of each while allowing for thermal expansion of the outer shells relative to the underlying support frames.

The exhaust nozzle 16 includes an outer shroud 26, an inner plug 28, and at least one support vane 30 as shown in FIGS. 1 and 2. The outer shroud 26 extends circumferentially around the axis 18. The inner plug 28 cooperates with the outer shroud 26 to form an exhaust nozzle flow path 32 therebetween. The at least one support vane 30 interconnects the outer shroud 26 and the inner plug 28 to support the inner plug 28 in the exhaust nozzle flow path 32. The exhaust products from the engine core 14 flow downstream through the exhaust nozzle flow path 32 from the engine core 14 to the atmosphere. The support vane 30 is mounted to a track 34 in the outer shroud 26 for movement of the inner plug 28 forward and aft along the axis 18 as suggested by the arrows 36 shown in FIG. 1. The inner plug 28 and the at least one support vane 30 may translate axially relative to the outer shroud 26 to change a flow path area of the exhaust nozzle flow path 32 to optimize the flow of exhaust products for low noise emissions during take-off or increased engine efficiency at cruise.

The inner plug 28 includes a plug-support frame 38, an outer plug shell 40, and a plurality of plug fastener units 42 that couple the outer plug shell 40 to the plug-support frame 38 as shown in FIG. 2. The plug-support frame 38 is arranged within an internal space 44 defined by the outer plug shell 40. The outer plug shell 40 covers the plug-support frame 38 to provide an aerodynamic outer flow path boundary for the inner plug 28. The plug-support frame 38 is coupled to the outer plug shell 40 to support the outer plug shell 40 in the exhaust nozzle flow path 32. The plug-support frame 38 is configured to transfer loads acting on the outer plug shell 40 to the support vane 30 and into the outer shroud 26. The plurality of fastener units 42 retain the outer plug shell 40 to the plug-support frame 38 while allowing the outer plug shell 40 to expand and contract relative to the plug-support frame 38 due to exposure to the hot exhaust products from the engine core 14. As such, the outer plug shell 40 is supported by the plug-support frame 38 but freely floats relative to the plug-support frame 38 so that adverse stresses are not imparted on the outer plug shell 40 or the plug-support frame 38 as a temperature of the exhaust nozzle changes.

The inner plug 28 is arranged on the axis 18 and is supported in the exhaust nozzle flow path 32 by first and second support vanes 30, 31 as shown in FIGS. 1 and 2. The support vanes 30, 31 are identical to one another except that they are swept forward away from the inner plug 28 in different directions. Only support vane 30 will be discussed below and the disclosure related to support vane 30 is hereby incorporated by reference for support vane 31.

The support vane 30 includes a vane-support frame 46, an outer vane shell 48, and a plurality of vane fastener units 50 that couple the outer vane shell 48 to the vane-support frame 46. The vane-support frame 46 is arranged within an internal space 51 defined by the outer vane shell 48. The outer vane shell 48 covers the vane-support frame 46 to provide an aerodynamic outer boundary of the support vane 30. The plurality of fastener units 50 retain the outer vane shell 48 to the vane-support frame 46 while allowing the outer vane shell 48 to expand and contract relative to the vane-support frame 46 due to exposure to the hot exhaust products from the engine core 14. As such, the outer vane shell 48 is supported by the vane-support frame 46 but freely floats relative to the vane-support frame 46 so that adverse stresses are not imparted on the outer vane shell 48 or the vane-support frame 46 as a temperature of the exhaust nozzle changes.

The plurality of plug fastener units 42 are substantially similar to the plurality of vane fastener units 50. Accordingly, the vane fastener units 50 are discussed below with reference to FIGS. 3-6 and their disclosure is hereby incorporated by reference for plug fastener units 42 which are discussed with reference to FIGS. 7-10.

Figure 3:
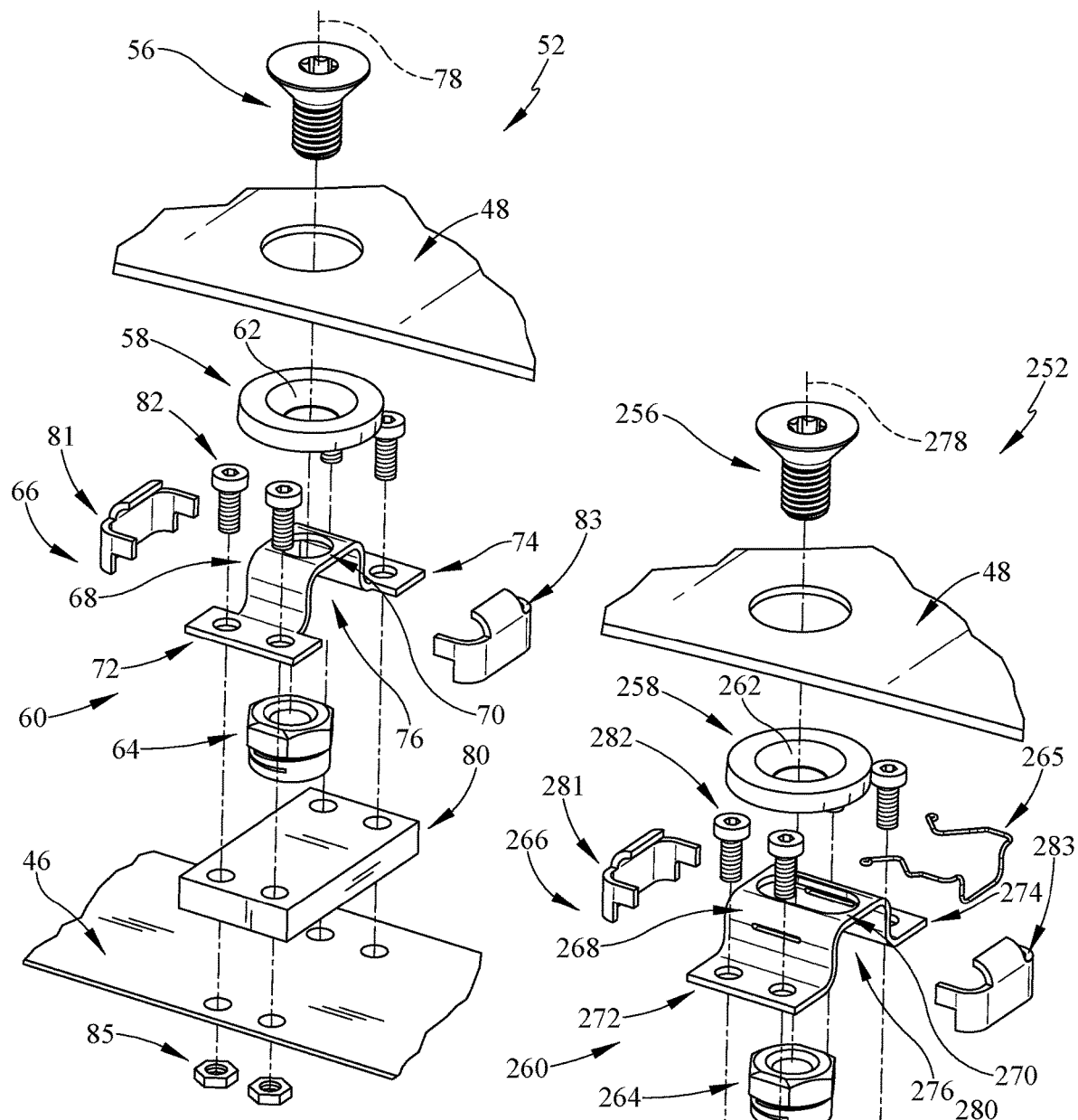
FIG. 3 is an exploded assembly view of an anchor fastener unit included in the plurality of fastener units showing that the anchor fastener unit includes, from top to bottom, a first fastener, a first wear plate, and a first mount unit that has a nut plate configured to anchor the outer shell to the underlying support frame for thermal expansion and contraction of the outer shell toward and away from the anchor fastener unit.
Figure 4:
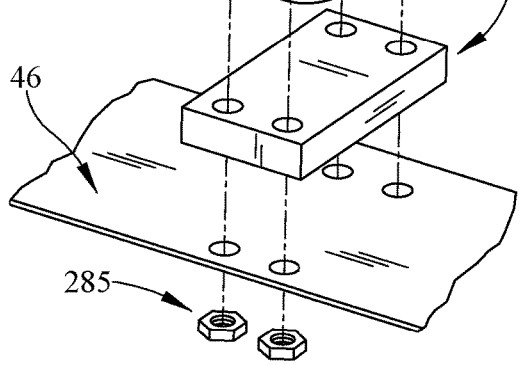
FIG. 4 is an exploded assembly view of an expansion-permissive fastener unit included in the plurality of fastener units showing that the expansion-permissive fastener unit includes, from top to bottom, a second fastener, a second wear plate, and a second mount unit that has a nut plate formed with a longitudinal slot configured to allow for unrestricted thermal expansion and contraction of the outer shell toward and away from the anchor fastener unit as the second fastener moves through the longitudinal slot.

The plurality of fastener units 50 include an anchor fastener unit 52, as shown in FIG. 3, and an expansion-permissive fastener unit 252, as shown in FIG. 4. The fastener units 52, 252 are substantially similar to one another except that the anchor fastener unit 52 provides an anchor point for the outer vane shell 48 while the expansion-permissive fastener unit 252 allows movement of the outer vane shell 48 relative to the vane-support frame 46 due to thermal expansion and contraction.

The anchor fastener unit 52 includes a first fastener 56, a first wear plate 58, and a first mount unit 60 as shown in FIG. 3. The first fastener 56 is illustratively embodied as a flat head screw, though any suitable fastener may be used. The first fastener 56 cooperates with the outer vane shell 48 to provide a smooth outer flow path surface for the vane 30 when installed. The first wear plate 58 is fixed to an inner surface of the outer vane shell 48 by welding, brazing or another suitable joining process. The first wear plate 58 has a tapered engagement surface 62 that receives a head of the first fastener 56. The first mount unit 60 is coupled to the underlying vane-support frame 46 and receives the first fastener 56 to couple the outer vane shell 48 to the vane-support frame 46.

The anchor fastener unit 52 anchors the outer vane shell 48 to the vane-support frame 46 using first mount unit 60 such that thermal expansion of the outer vane shell 48 is away from the anchor fastener unit 52. The first mount unit 60 includes a first retainer 64 and a first nut-plate 66 as shown in FIG. 3. The first nut-plate 66 includes a body 68 that is formed to include an aperture 70 and a pair of attachment flanges 72, 74 coupled to opposite sides of the body 68. The body 68 is offset from the attachment flanges 72, 74 to provide a gap 76 into which the aperture 70 opens. The first fastener 56 protrudes through the aperture 70 along an axis 78 into the gap 76 where it is received by the retainer 64. The aperture 70 in the body 68 is circular and blocks radial movement of the first fastener 56 and the outer vane shell 48 away from the axis 78. The retainer 64 blocks axial movement of the first fastener 56 and the outer vane shell 48 along the axis 78.

The mount unit 60 may further include a shim 80 between the nut plate 66 and the vane support frame 46 and side walls 81, 83 as shown in FIG. 3. The shim 80 may be included to accommodate varying spaces between the outer vane shell 48 and the underlying vane-support frame 46. The side walls 81, 83 are coupled to each open-end of the gap 76 to enclose the retainer 64 in the gap 76. The side walls 81, 83 may be separate components that are joined by welding or brazing or integral components that are bent inwardly from the body 68 or either of the flanges 72, 74. The nut plate 66 is coupled to the vane support frame 46 (and the shim 80, if included) by a plurality of fasteners 82 that are secured by nuts 85. In other embodiments, the nut plate 66 may be joined to the vane-support frame by another suitable structure or process such as by a clip, rivet, pin, adhesive, welding, brazing, soldering, etc.

The expansion-permissive fastener unit 252 is similar to the anchor fastener unit 52. The expansion-permissive fastener unit 252 includes a second fastener 256, a second wear plate 258, and a second mount unit 260 as shown in FIG. 4. The second fastener 256 is illustratively embodied as a flat head screw, though any suitable fastener may be used. The second fastener 256 cooperates with the outer vane shell 48 to provide a smooth outer flow path surface for the vane 30 when installed. The second wear plate 258 is fixed to an inner surface of the outer vane shell 48 by welding, brazing or another suitable joining process. The second wear plate 258 has a tapered engagement surface 262 that receives a head of the second fastener 256. The second mount unit 260 is coupled to the underlying vane-support frame 46 and receives the second fastener 256 to couple the outer vane shell 48 to the vane-support frame 46.

The expansion-permissive fastener unit 252 is configured to allow thermal expansion and contraction of the outer vane shell 48 toward and away from the anchor point provided by the anchor fastener unit 52. The second mount unit 260 includes a second retainer 264, a retainer clip 265, and a second nut-plate 266 as shown in FIG. 4. The second nut-plate 266 includes a body 268 that is formed to include an aperture 270, and a pair of attachment flanges 272, 274 coupled to opposite sides of the body 268. The body 268 is offset from the attachment flanges 272, 274 to provide a gap 276 into which the aperture 270 opens. The second fastener 256 protrudes through the aperture 270 along an axis 278 and into the gap 276 where it is received by the retainer 264. The aperture 270 in the body 268 is formed as a longitudinal slot and allows the second fastener 256 to move or translate through the slot unrestricted as the outer vane shell 48 expands. The retainer 264 blocks axial movement of the second fastener 256 and the outer vane shell 48 along the axis 278. The retainer clip 265 interconnects the retainer 264 and the nut plate 266 to block rotation of the retainer 264 about the axis 278. This prevents unintentional removal of the retainer 264 from the second fastener 256 while still allowing the fastener 256 and the retainer 264 to move through the aperture 270.

The mount unit 260 may further include a shim 280 between the nut plate 266 and the vane support frame 46 and side walls 281, 283 as shown in FIG. 4. The shim 280 may be used to accommodate varying spaces between the outer vane shell 48 and the underlying vane-support frame 46. The side walls 281, 283 may be coupled to each open-end of the gap 276 to enclose the retainer 264 in the gap 276. The side walls 281, 283 may be separate components that are joined by welding or brazing or integral components that are bent inwardly from the body 268 or either of the flanges 272, 274. The nut plate 266 is coupled to the vane support frame 46 (and the shim 280, if used) by a plurality of fasteners 282 that are be secured by nuts 285. In other embodiments, the nut plate 266 may be joined to the vane-support frame by another suitable structure or process such as by a clip, rivet, adhesive, welding, brazing, soldering, etc.

Figure 5:
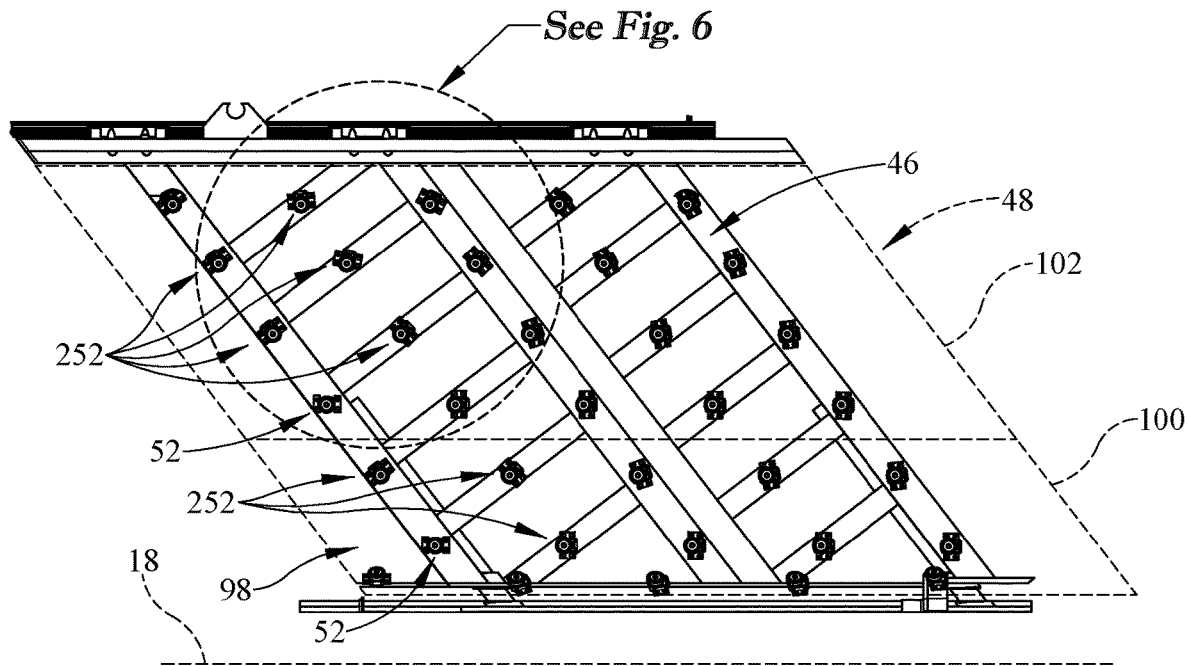
FIG. 5 is a top elevation view of one of the support vanes with the outer vane shell hidden to show an arrangement of anchor fastener units and expansion-permissive fastener units that control thermal expansion and contraction of the outer vane shell relative to the vane-support frame.
Figure 6:
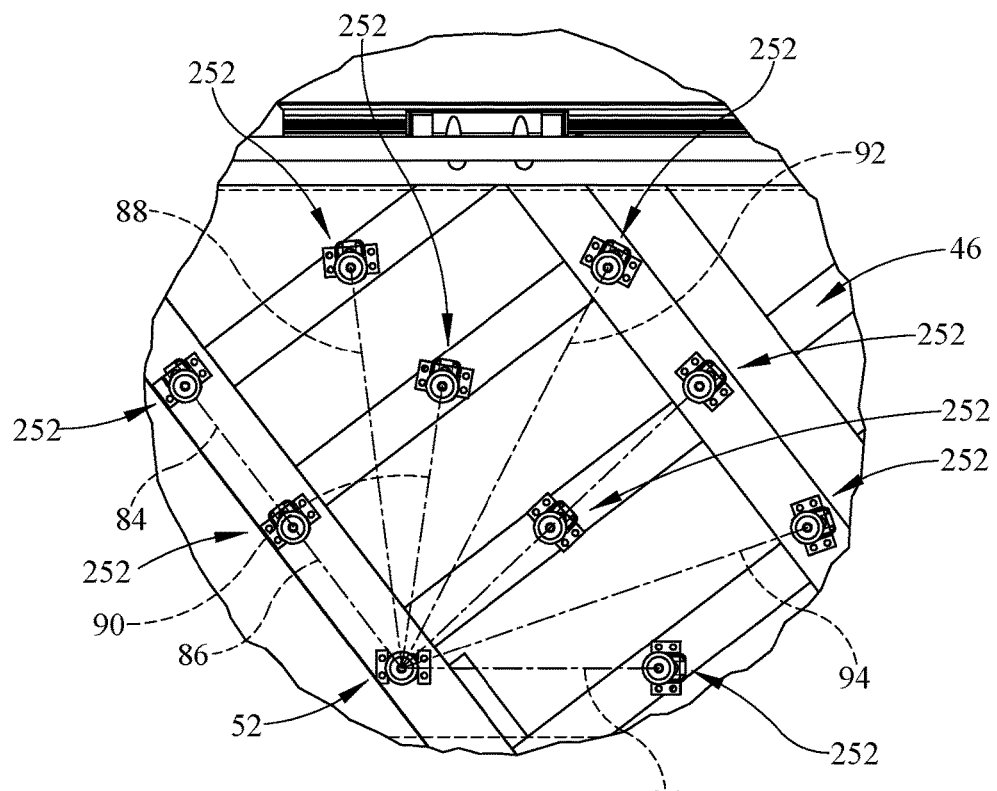
FIG. 6 is an enlarged portion of FIG. 5 showing that the vane includes at least one anchor fastener unit and a plurality of expansion-permissive fastener units that are spaced apart from one another and oriented so that each longitudinal slot is elongated along an axis that extends through a center of the anchor fastener unit.
Figure 7:
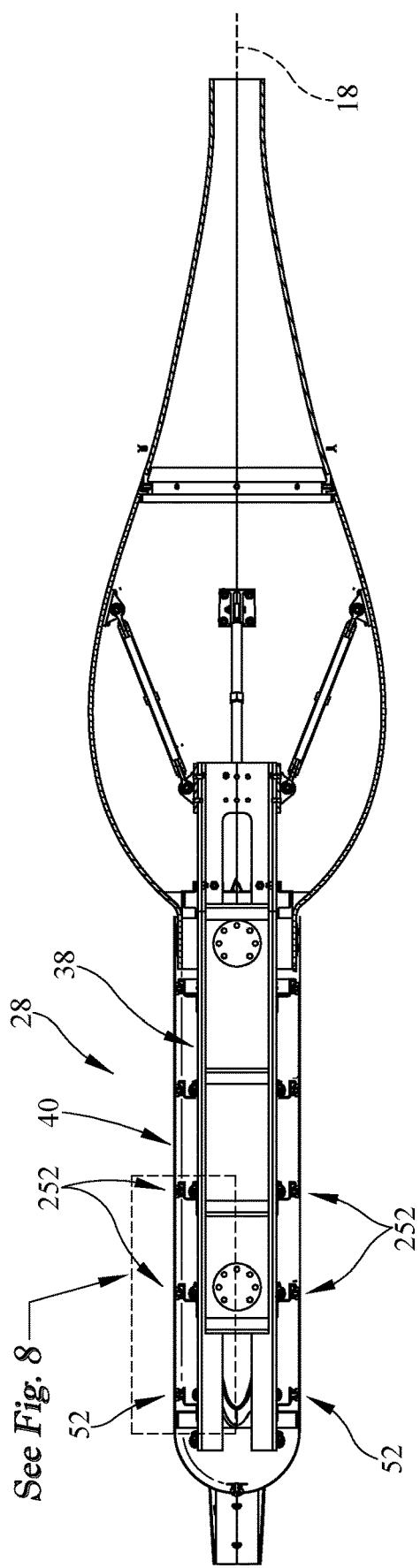
FIG. 7 is a cross section taken along line 7-7 in FIG. 2 showing that the outer plug shell is coupled to the underlying plug-support frame by at least one anchor fastener unit and a plurality of expansion-permissive fastener units.
Figure 8:
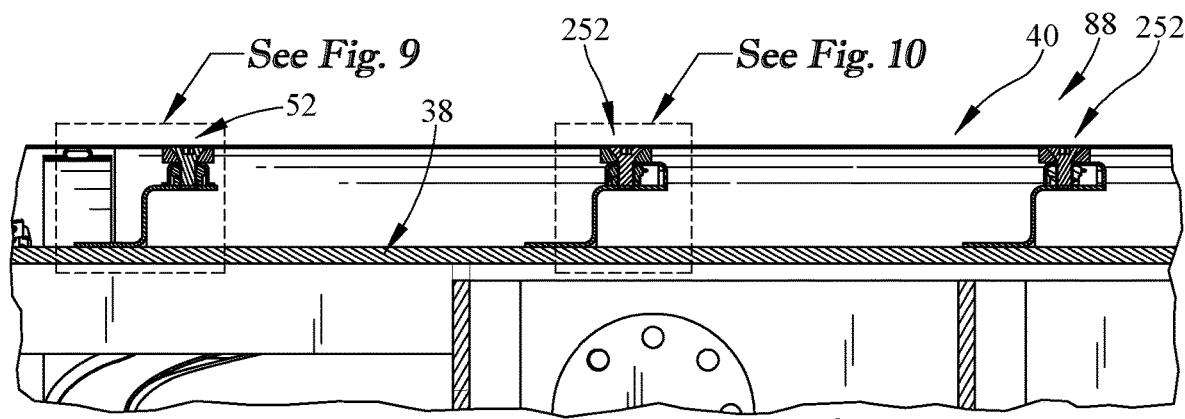
FIG. 8 is an enlarged portion of FIG. 7 showing an anchor fastener unit located at an axially forward end of the inner plug and a plurality of expansion-permissive fastener units located aft of the anchor fastener unit to allow the outer plug shell to thermally expand in an aft direction.

In the illustrative embodiment, the fastener units 50 includes more expansion-permissive fastener units 252 than anchor fastener units 52 as shown in FIGS. 5 and 6. Each vane 30 may have only one anchor fastener unit 52 while the rest of the fastener units 50 are expansion-permissive fastener units 252. The number of anchor fastener units 52 included may increase depending on the number of shell panels included in outer vane shell 48 as will be discussed.

Each expansion-permissive fastener unit 252 is coupled to the vane-support frame 46 and oriented to allow thermal expansion and contraction of the outer vane shell toward and away from the anchor fastener unit 52 as shown in FIGS. 5 and 6. The expansion-permissive fastener units 252 are spread across the vane-support frame 46 and spaced apart from one another to provide a plurality of connection points that are distributed across the entire area of the outer vane shell 48. The expansion-permissive fastener units 252 are oriented such that the longitudinal slot 270 in each second nut plate 266 is elongated along a respective axis that extends through a center of the anchor fastener unit 52 as shown in FIG. 6. Some axes (i.e. axis 84 and axis 86) may be parallel and/or coaxial to one another while others (i.e. axes 88, 90, 92, 94, 96) are non-parallel and spaced apart from one another. The vanes 30 may have a three-dimensional shape that causes some of the axes to be coplanar with the anchor fastener unit 52. Accordingly, in some embodiments, the term parallel may include the term coplanar depending on which direction the axes are viewed from.

In the illustrative embodiment, the anchor fastener unit 52 is located at a forwardmost and innermost corner 98 of the outer vane shell 48 relative to the central axis 18 as shown in FIG. 5. This corner 98 generally corresponds to an area of the outer vane shell 48 that is exposed to the hottest temperatures in the illustrative exhaust nozzle 16. The expansion-permissive fastener units 252 are dispersed away from the anchor fastener unit 52 and oriented so that the outer vane shell expands away from the anchor fastener unit 52 as described above.

The outer vane shell 48 may include a plurality of shell panels as shown in FIG. 2 and suggested in FIG. 5. The outer vane shell 48 in the illustrative embodiment, includes a first shell panel 100 and a second shell panel 102. Each shell panel 100, 102 is coupled to the underlying vane-support frame 46 by a single anchor fastener unit 52 and a plurality of expansion-permissive fastener units 252. The anchor fastener unit 52 is located at a forwardmost and innermost corner of each respective panel 100, 102 relative to the central axis 18.

The vane 30 may further include one or more expansion joints 104 between panels 100, 102 and between vane 30 and outer shroud 26 as shown in FIG. 2. The expansion joints 104 provide slight clearance gap radially between the panels 100, 102 and/or between the outer vane shell 48 and the outer shroud 26 to allow them to expand thermally outward away from the anchor fastener unit 52. The first shell panel 100 is configured to grow thermally toward the second shell panel 102 and the second shell panel 102 is configured to grow thermally toward the outer shroud 26 in the illustrative embodiment. However, in other embodiments the panels 100, 102 may be configured to grow thermally in other directions such as toward the inner plug 28.

The fastener units 42 of the inner plug 28 also include at least one anchor fastener unit 52 and a plurality of expansion-permissive fastener units 252 to couple the outer plug shell 40 to the plug-support frame 38 as shown in FIGS. 7-10. The outer plug shell 40 is fixed to the plug-support frame 38 by the anchor fastener unit 52 and is allowed to grow relative to the plug-support frame 38 by a plurality of second fasteners 252. The anchor fastener unit 52 is located at an axially forward end of the inner plug 28 which in the illustrative embodiment is an area of the inner plug 28 that is exposed to the highest temperatures. The expansion-permissive fastener units 252 are located aft of the anchor fastener unit 52 to allow the outer plug shell 40 to thermally expand in the aft direction away from the anchor fastener unit 52. The anchor fastener unit 52 and the expansion-permissive fastener unit 252 may be arranged differently in other embodiments to allow thermal growth of the outer plug shell in a different direction or manner.

Figure 9:
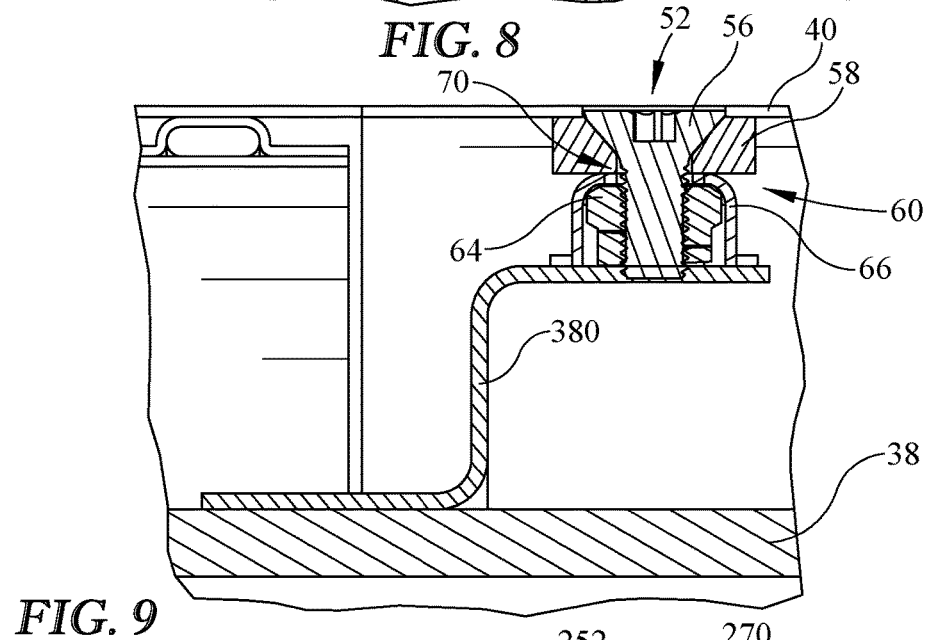
FIG. 9 is an enlarged portion of FIG. 8 showing the anchor fastener unit interconnecting the outer plug shell and the plug-support frame to provide an anchor point for the outer plug shell.
Figure 10:
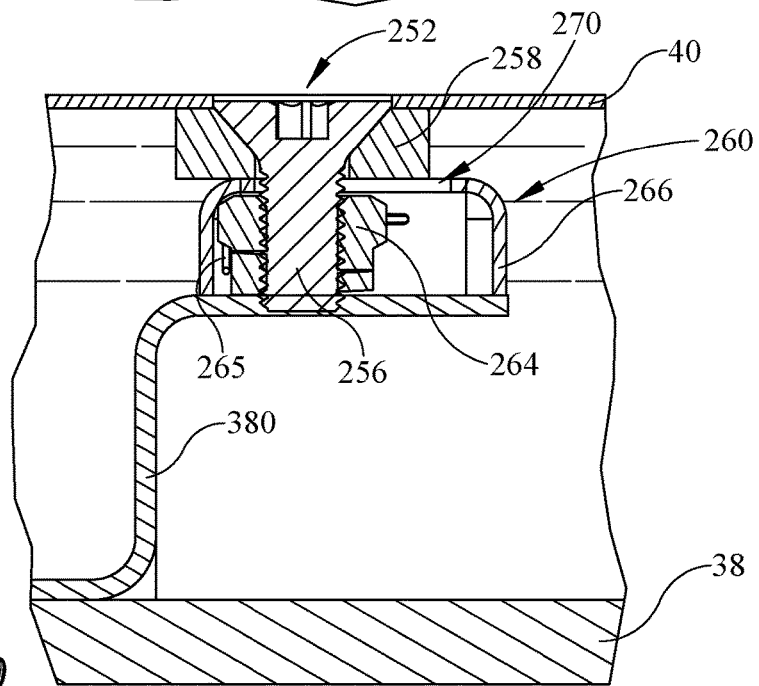
FIG. 10 is an enlarged portion of FIG. 8 showing one of the expansion-permissive fastener units interconnecting the outer plug shell and the plug-support frame with the longitudinal slot extending in the aft direction to provide clearance for the second fastener to translate through the slot as a temperature of the outer plug shell increases.

The anchor fastener unit 52 and the expansion-permissive fastener units 252 are coupled to the plug-support frame 38 by a spacer bracket 380 as shown in FIGS. 9 and 10. The spacer bracket 380 provides a similar function to the shims 80, 280 discussed previously and may be replaced with shims 80, 280 in some embodiments. Alternatively, the fastener units 52, 252 may be sized such that the spacer brackets 380 and/or shims 80, 280 may be omitted in some embodiments.

In some embodiments, the gas turbine engine 10 may be used on an aircraft that supports supersonic flight. The engine 10 include an exhaust nozzle 16 that may have an integral thrust reverser and the ability to vary the nozzle throat area. The exhaust nozzle 16 (a nozzle that incorporates an aft center body) may provide a broad efficiency peak across operating ranges of the gas turbine engine 10. The shaping of the inner and outer flow path lines provides may efficient operation at the cruise point and quiet operation during takeoff.

In some embodiments, the plug is supported by vanes that are attached to the exhaust nozzle case and transfer load to through the case to the nozzle support system. The plug may be supported by 2, 3, 4 or any suitable number of vanes. These configurations may share a common design feature in that the plug is allowed to grow thermally without adversely affecting the operation of the system, while at the same time passing aerodynamic loads to the vanes and to the outer shroud.

These configurations share a common design feature in that the skin (or panels) that form the aerodynamic flow surfaces on the vanes and center body (plug) are allowed to grow thermally without adversely affecting the operation of the system (the aerodynamic flow) (i.e. reducing binding between components by letting the outer skin grow unrestricted).

In some embodiments, the vanes and forward portion of the plug are covered with skin panels that form the aerodynamic flow path around each vane. The skin panels are sized to control thermal growth and prevent buckling. The skin panels are attached to the vane structure with nut plates that have been configured to allow movement between the underlying structure and the panels.

In some embodiments, this concept controls the thermal movement of the skin by anchoring the panels using one fastener and nut plate (see FIGS. 3 and 9) in a corner and directing the thermal growth of the panels away from this pin using slotted nut plates (see FIGS. 4 and 10). The nut plates are oriented to allow the skin to grow away from the pin position in a straight line. Provision may be made to control the sliding and wear of the skin and nut plate by selecting the materials and coatings for the nut plate outer cover and the wear disk bonded to the panel and located between the fastener and the nut plate. The load that the fastener applies to panel and fastener may be selected to meet wear goals for the components. Fastener unit spacing is set to control local panel deformation and has been selected to provide minimal impact to the nozzle performance. The internal arrangement of the thermally compliant skin for a three and four vane configuration may have some minor variations, but the concept may remain the same.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising
   an engine core including a compressor configured to receive and compress an airflow, a combustor configured to receive a compressed airflow from the compressor and combust the compressed airflow to produce combustion products, and a turbine configured to interact with the combustion products, and
   an exhaust nozzle configured to receive the combustion products from the engine core, the exhaust nozzle including an outer shroud arranged circumferentially about an axis to define an outer boundary surface of an exhaust nozzle flow path, an inner plug arranged circumferentially about the axis to define an inner boundary surface of the exhaust nozzle flow path, and a support vane that extends between the outer shroud and the inner plug through the exhaust nozzle flow path,
   wherein the inner plug includes a plug-support frame coupled to the support vane, an outer plug shell that covers the plug-support frame, and the support vane includes a vane-support frame that interconnects the plug-support frame and the outer shroud and an outer vane shell that covers the vane-support frame, and
   wherein both the inner plug and the support vane further include a plurality of fastener units that couple the outer plug shell to the plug support frame and couple the outer vane shell to the vane-support frame, the plurality of fastener units being configured to allow the outer plug shell to thermally expand and contract relative to the plug-support frame and to allow the outer vane shell to thermally expand and contract relative to the vane-support frame.

2. The gas turbine engine of claim 1, wherein each fastener unit included in the plurality of fastener units includes a wear plate fixed to an inner surface of one of the outer plug shell and the outer vane shell, a fastener that extends through the wear plate and one of the outer plug shell and the outer vane shell, and a nut-plate coupled to one of the plug-support frame and the vane-support frame to receive the fastener and couple the outer plug shell to the plug-support frame and to couple the outer vane shell to the vane-support frame.

3. The gas turbine engine of claim 2, wherein the plurality of fastener units includes an anchor fastener unit and an expansion-permissive fastener unit, the nut plate of the anchor fastener unit being formed to include a circular shaped aperture that receives the fastener of the anchor fastener unit to fix the outer vane shell and the outer plug shell in position relative to the anchor fastener unit, the nut plate of the expansion-permissive fastener unit being formed to include a longitudinal slot that receives the fastener of the expansion-permissive fastener unit.

4. The gas turbine engine of claim 3, wherein the fastener of the expansion-permissive fastener unit is configured to translate through the longitudinal slot as the temperature of the exhaust nozzle changes to allow the outer plug shell and the outer vane shell to thermally expand and contract relative to the plug-support frame and to allow the outer vane shell to thermally expand and contract relative to the vane support frame.

5. The gas turbine engine of claim 3, wherein the longitudinal slot in the nut-plate of the expansion-permissive fastener unit is elongated along a first axis that extends through a center of the fastener of the anchor fastener unit.

6. An exhaust nozzle comprising
an outer shroud arranged circumferentially about an axis to define an outer boundary surface of an exhaust nozzle flow path,
an inner plug arranged circumferentially about the axis to define an inner boundary surface of the exhaust nozzle flow path, and
a support vane that extends between the outer shroud and the inner plug through the exhaust nozzle flow path,
wherein the inner plug includes a plug-support frame coupled to the support vane, an outer plug shell that covers the plug-support frame, and a plurality of fastener units that couple the outer plug shell to the plug support frame and are configured to allow the outer plug shell to thermally expand and contract relative to the plug-support frame.

7. The exhaust nozzle of claim 6, wherein each fastener unit includes a wear plate fixed to an inner surface of the outer plug shell, a fastener that extends through the wear plate and the outer plug shell, and a nut-plate coupled to the plug-support frame to receive the fastener and couple the outer plug shell to the plug-support frame.

8. The exhaust nozzle of claim 6, wherein the plurality of fastener units includes an anchor fastener unit and a plurality of expansion-permissive fastener units, the anchor fastener unit being configured to fix the outer plug shell relative to the plug-support frame, the plurality of second expansion permissive fasteners being configured to allow thermal growth of the outer plug shell toward and away from the anchor fastener unit.

9. The exhaust nozzle of claim 8, wherein each expansion-permissive fastener unit includes a fastener and a nut plate that is formed to include a longitudinal slot and the fastener is configured to translate through the longitudinal slot as the temperature of the exhaust nozzle changes to allow the outer plug shell to thermally expand and contract relative to the plug-support frame.

10. The exhaust nozzle of claim 9, wherein the longitudinal slot in the nut-plate of each expansion-permissive fastener unit is elongated along an axis that extends through a center of the anchor fastener unit.

11. The exhaust nozzle of claim 10, wherein at least two of the axes are non-parallel to one another.

12. The exhaust nozzle of claim 10, wherein the anchor fastener unit is located at an axially forward end of the inner plug relative to the central axis and the plurality of expansion-permissive fastener units are located axially aft of the anchor fastener unit.

13. An exhaust nozzle comprising
an outer shroud arranged circumferentially about an axis to define an outer boundary surface of an exhaust nozzle flow path,
an inner plug arranged circumferentially about the axis to define an inner boundary surface of the exhaust nozzle flow path, and
at least one support vane that extends between the outer shroud and the inner plug through the exhaust nozzle flow path,
wherein the support vane includes a vane-support frame coupled to the inner plug, an outer vane shell that covers the vane-support frame, and a plurality of fastener units that couple the outer vane shell to the vane support frame and are configured to allow the outer vane shell to thermally expand and contract relative to the vane-support frame.

14. The exhaust nozzle of claim 13, wherein each fastener unit includes a wear plate fixed to an inner surface of the outer vane shell, a fastener that extends through the wear plate and the outer vane shell, and a nut-plate coupled to the vane-support frame to receive the fastener and couple the outer vane shell to the vane-support frame.

15. The exhaust nozzle of claim 13, wherein the plurality of fastener units includes an anchor fastener unit and a plurality of expansion-permissive fastener units, the anchor fastener unit being configured to fix the outer vane shell relative to the vane-support frame, the plurality of second expansion permissive fasteners being configured to allow thermal growth of the outer vane shell toward and away from the anchor fastener unit.

16. The exhaust nozzle of claim 15, wherein the plurality of expansion-permissive fastener unit each include a fastener and a nut plate that is formed to include a longitudinal slot and the fastener is configured to translate through the longitudinal slot as the temperature of the exhaust nozzle changes to allow the outer plug shell to thermally expand and contract relative to the plug-support frame.

17. The exhaust nozzle of claim 16, wherein the longitudinal slot in the nut-plate of each expansion-permissive fastener unit is elongated along an axis that extends through a center of the anchor fastener unit.

18. The exhaust nozzle of claim 17, wherein at least two of the axes are non-parallel to one another.

19. The exhaust nozzle of claim 13, wherein the outer vane shell includes a first panel and a second panel, both the first panel and the second panel including an anchor fastener unit at a forwardmost and innermost corner of each panel relative to the central axis that fixes the first panel and the second panel relative to the vane-support frame and a plurality of second expansion permissive fasteners that allow the first panel and the second panel to thermally expand and contract toward and away from the anchor fastener unit of the first panel and the second panel.

20. The exhaust nozzle of claim 19, wherein the outer vane shell further includes a joint strip between the first panel and the second panel that provides a clearance gap to allow the first panel to thermally expand toward the second panel away from the anchor fastener unit of the first panel.

\* \* \* \* \*